United States Patent [19]
Van Der Lely

[11] 3,890,769
[45] June 24, 1975

[54] HAY MAKING MACHINES

[76] Inventor: Cornelis van der Lely, 7, Bruschenrain, Zug, Switzerland

[22] Filed: Nov. 19, 1973

[21] Appl. No.: 417,230

Related U.S. Application Data

[62] Division of Ser. No. 231,899, March 6, 1972, Pat. No. 3,785,133.

[30] Foreign Application Priority Data

Mar. 5, 1971 Netherlands.................... 7102932

[52] U.S. Cl.......................................... 56/1; 56/370
[51] Int. Cl. ................................ A01d ; A01d 79/00
[58] Field of Search ..................... 56/370, 192, 6, 1

[56] References Cited
FOREIGN PATENTS OR APPLICATIONS

| | | | |
|---|---|---|---|
| 257,243 | 1/1967 | Austria ............................... | 56/370 |
| 1,488,684 | 6/1967 | France................................. | 56/192 |

*Primary Examiner*—Russell R. Kinsey
*Attorney, Agent, or Firm*—Mason, Mason & Albright

[57] ABSTRACT

A raking device includes rotary rake members on a beamed frame housing the driving means including pinion gears on bearings supported on a common drive shaft that is connectable to a p.t.o. through a gear box. The construction and repair of the device is simplified by using a profiled main beam that receives the drive shaft with some of the pinions together with bearings already assembled. The assembly is passed through an open bottom in the main beam and the assembly is easily secured in place by bolting, or otherwise securing, the bearings in partition recesses. Thereafter the rotary members together with their gears are fitted at the beam ends and the gears meshed with those on the shaft. Each end of the hollow beam is first closed by a head wall to which an L-shaped partition is welded. The horizontal leg of the partition is apertured to receive an upwardly extending shaft of a raking member which shaft is welded in place. A rotatable sleeve with bearings and gearing is then fitted on the shaft and held in place by a circlip. Spokes with tines are connected to the sleeve which is rotated through the meshed gearing between the sleeve of each rake member and the drive shaft. This method of assembly enables the device to be made in an assembly line with jigs and easily repaired because the driving parts are readily mounted and removed in an assembled form without special skills or tools.

10 Claims, 15 Drawing Figures

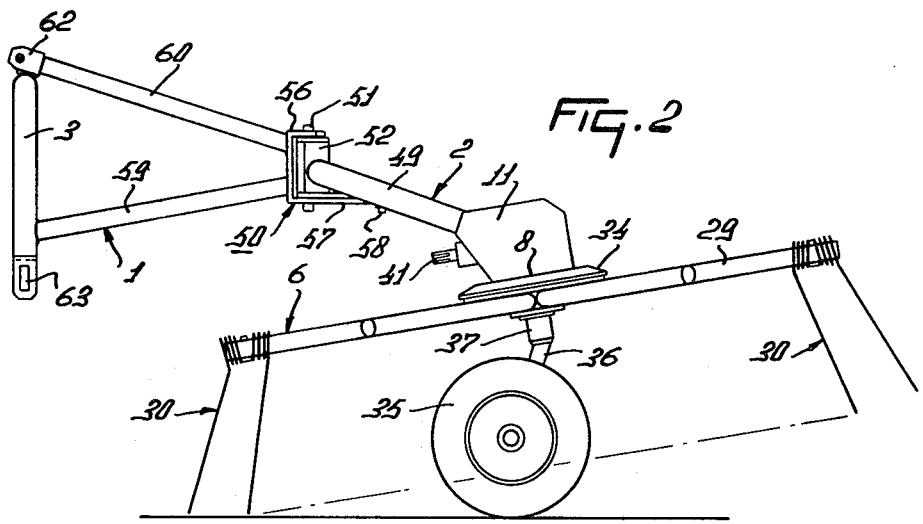
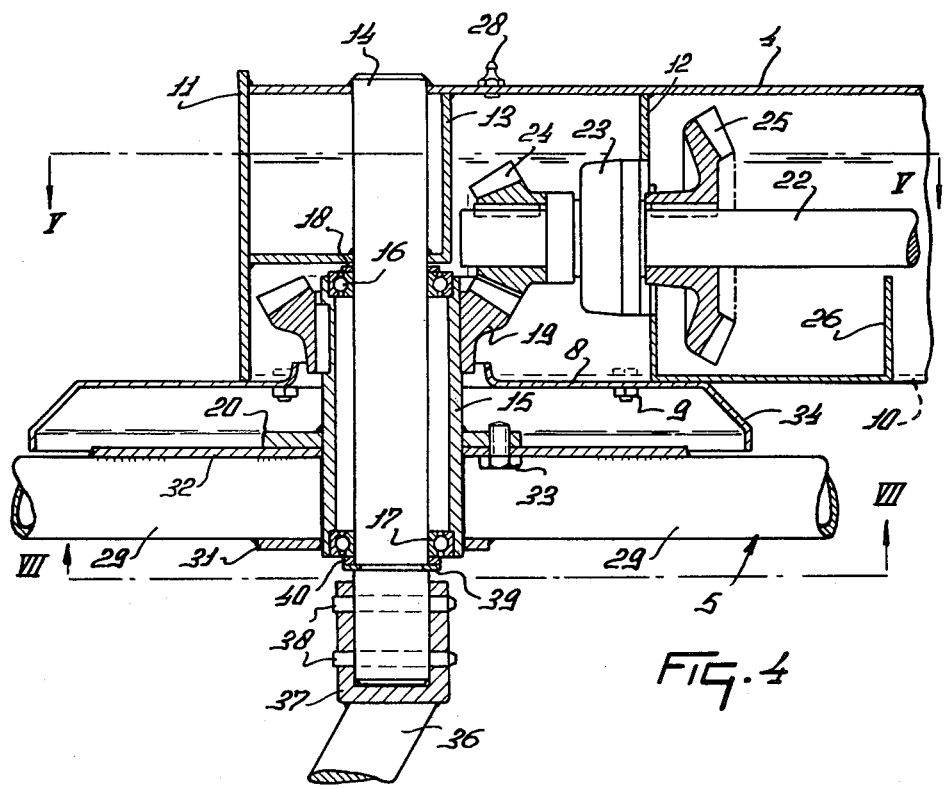

FIG. 6

FIG. 7

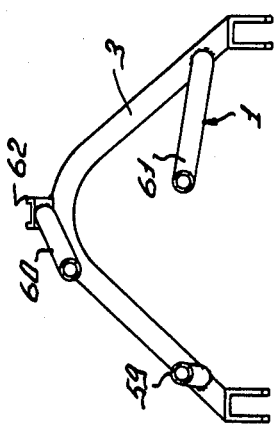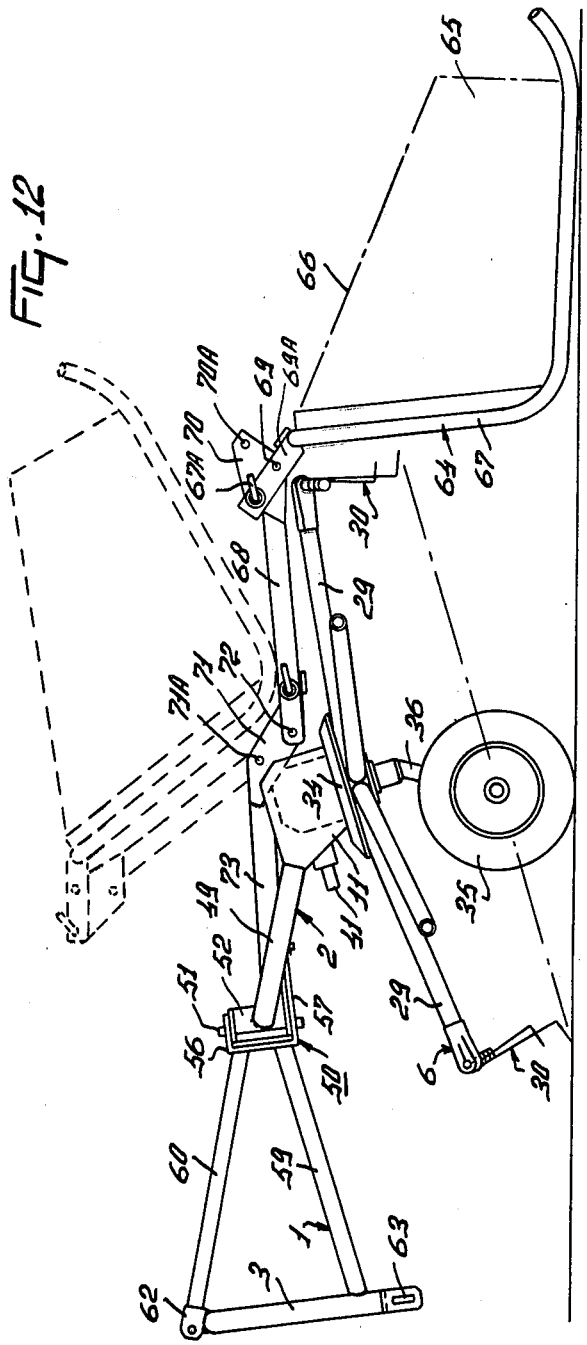

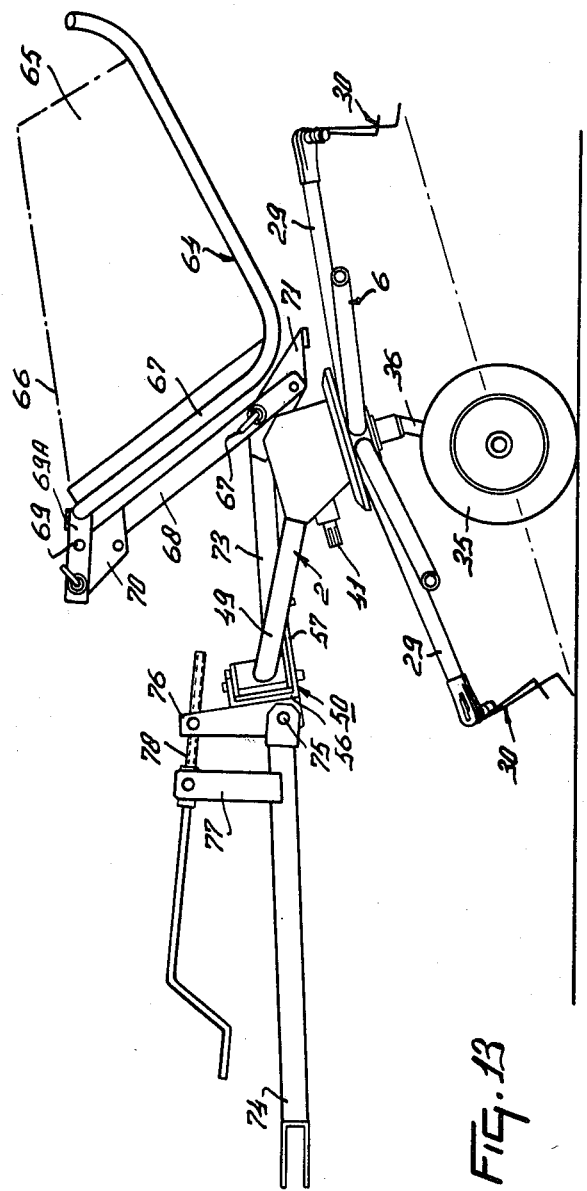

HAY MAKING MACHINES

This application is a division of Ser. No. 231,899 filed Mar. 6, 1972 now U.S. Pat. No. 3,785,133.

Figure 1:
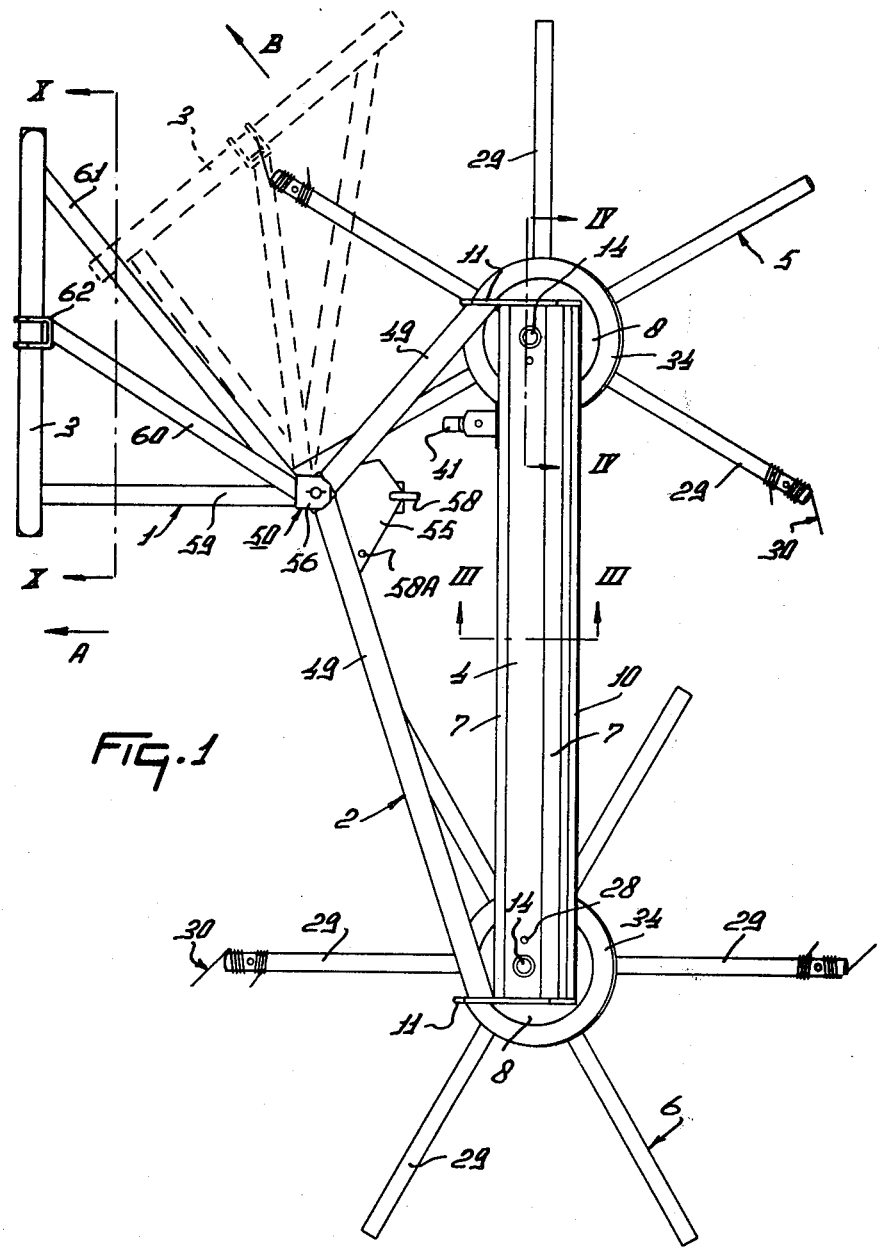
Figure 3:
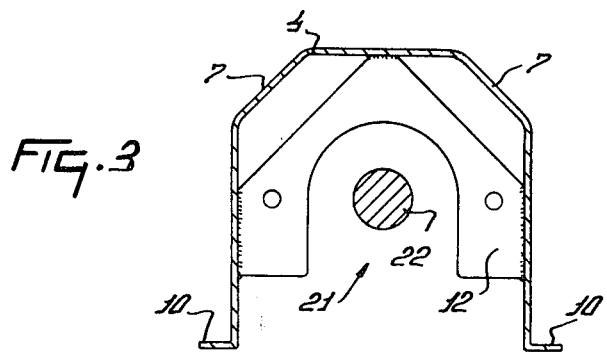
Figure 5:
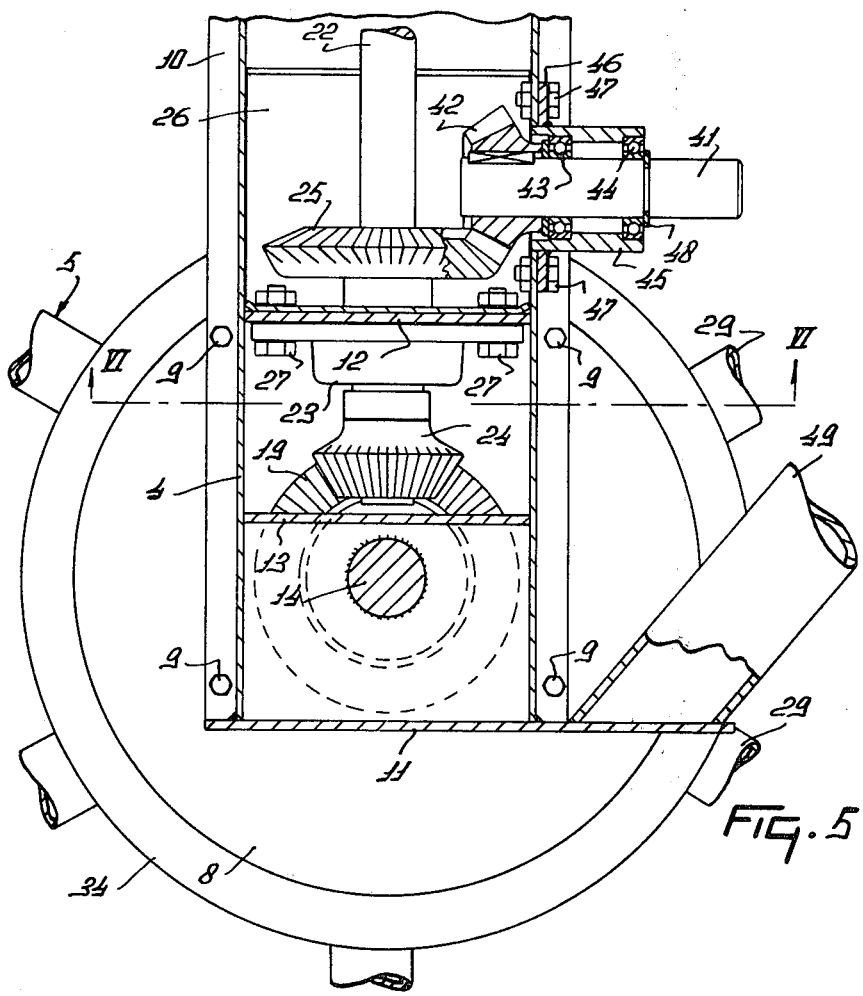
Figure 8:
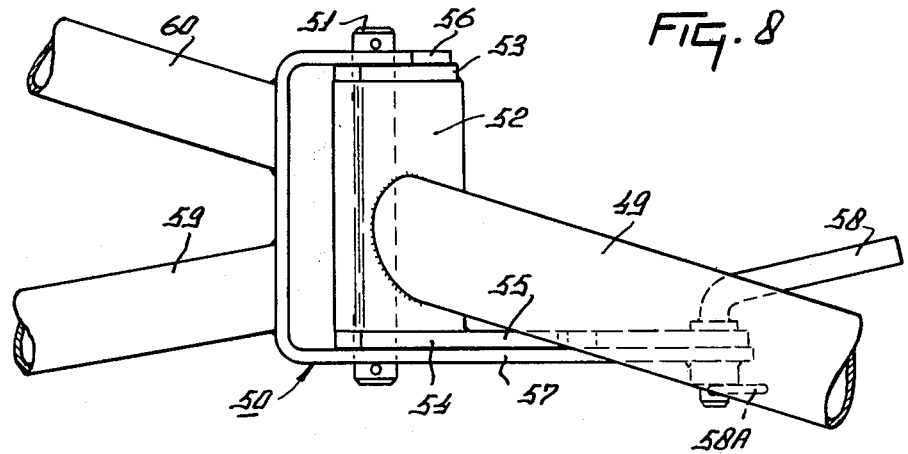
Figure 9:
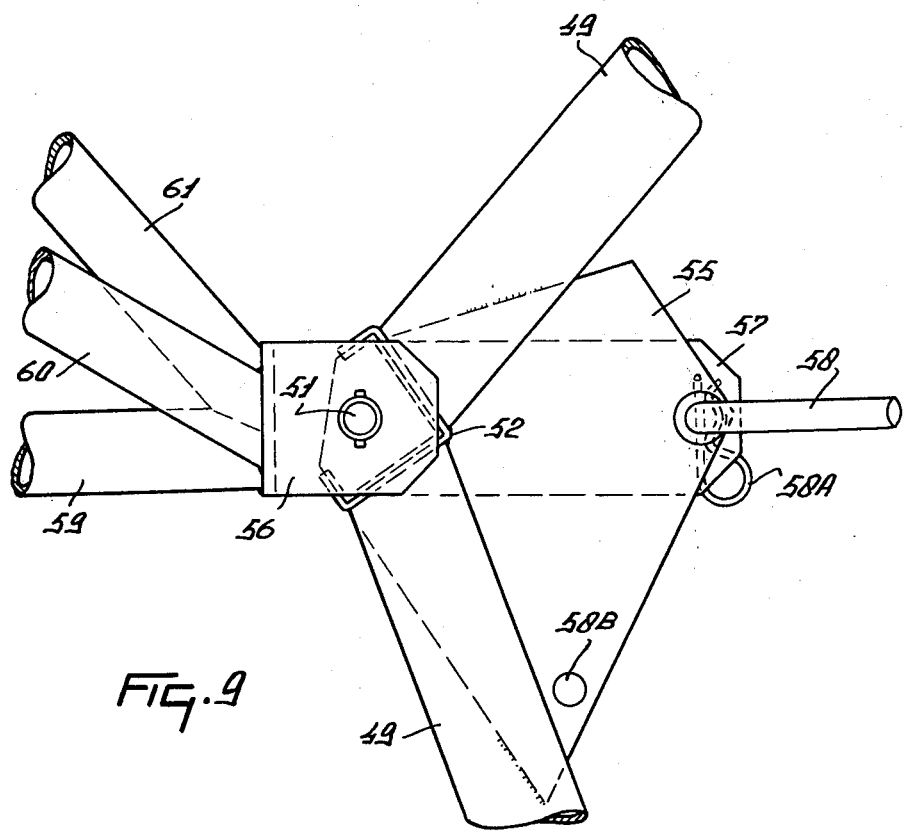
Figure 11:
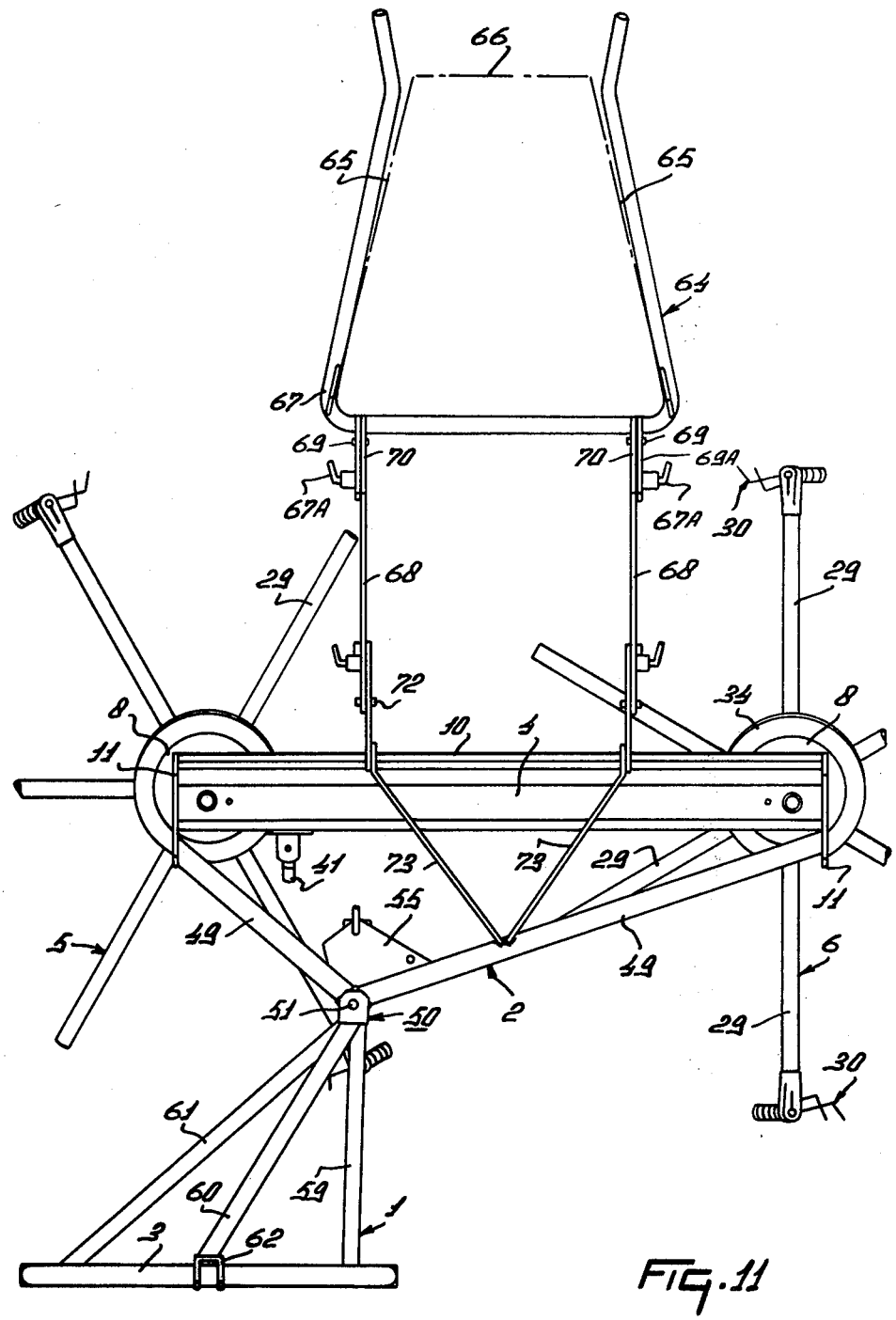
Figure 14:
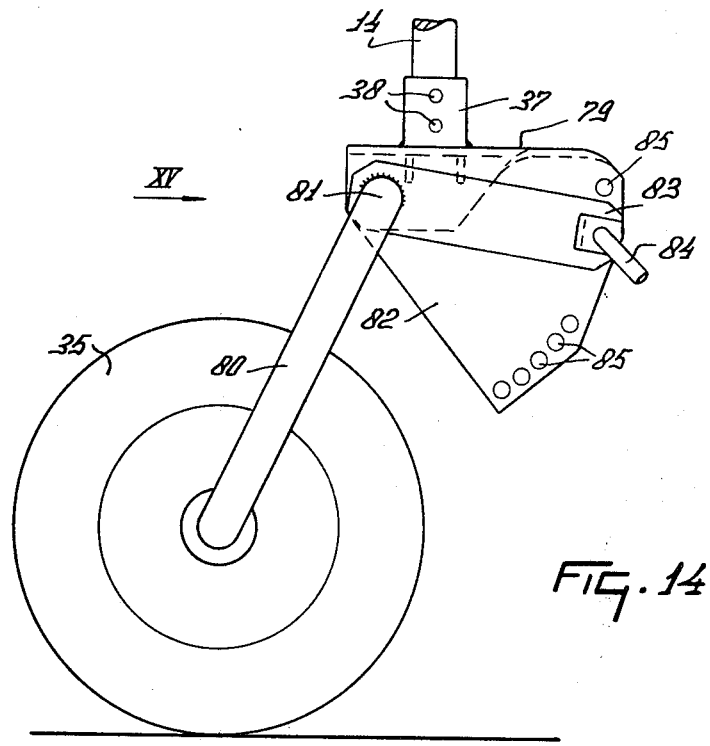
Figure 15:
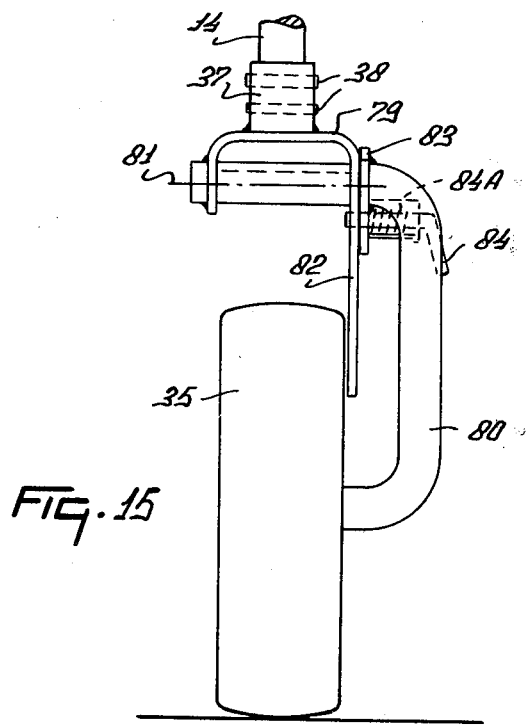

For a better understanding of the invention, and to show how the same may be carried into effect, reference will now be made, by way of example, to the accompanying drawings, in which:

FIG. 1 is a plan view of a hay making machine in accordance with the invention and shows the machine in both a working position and a position suitable for the inoperative transport thereof, FIG. 2 is a side elevation of the machine of FIG. 1 occupying a working position, FIG. 3 is a section, to an enlarged scale, taken on the line III—III of FIG. 1, FIG. 4 is a section, to an enlarged scale, taken on the line IV—IV of FIG. 1, FIG. 5 is a section taken on the line V—V of FIG. 4, FIG. 6 is a section taken on the line VI—VI of FIG. 5, FIG. 7 is a section taken on the line VII—VII of FIG. 4, FIG. 8 is a side elevation, to an enlarged scale, of a pivotal connection or hinge between two main frame portions of the machine, FIG. 9 is a plan view corresponding to FIG. 8, FIG. 10 is a section taken on the line X—X of FIG. 1, FIG. 11 substantially corresponds to FIG. 1 but illustrates the provision of additional parts, FIG. 12 is a side elevation corresponding to FIG. 11 and shows the additional parts in both operative and inoperative positions, FIG. 13 substantially corresponds to FIG. 12 but illustrates a hay making machine that is adapted to be towed over the ground rather than semi-mounted upon the three-point lifting device or hitch of a tractor or other operating vehicle, FIG. 14 is a side elevation of an alternative adjustable ground wheel mounting, and FIG. 15 is a front elevation as seen in the direction indicated by an arrow XV in FIG. 14, Referring to FIGS. 1 to 10 of the drawings, the hay making machine which is illustrated has a frame which is formed in two main portions 1 and 2 respectively. The two main frame portions 1 and 2 are pivotable relative to one another about a substantially vertical upright axis and can be retained in different angular settings relative to one another in a manner which will be described below. The main frame portion 1 carries a coupling part 3 (FIGS. 1, 2 and 10 of the drawings) which is constructed for connection to the three-point lifting device or hitch of an agricultural tractor or other operating vehicle in a manner which will also be described in greater detail below. The main frame portion 2 includes a beam 4 that is formed from sheet metal and to which two rake members, in the form of rake heads 5 and 6, are connected so as to be rotatable in relatively opposite directions. It can be seen from FIG. 3 of the drawings that the sheet metal beam 4 has an inverted generally U-shaped cross-section throughout part of its length and it is greatly preferred that the sheet metal which is employed to form the beam should be pressed steel sheet. A beam or other object formed from pressed steel sheet is to be interpreted in this Specification as being a beam or other object that is formed from a single steel sheet by pressing, deep-drawing, explosion-deformation or a like shaping process.

As has already been mentioned, the beam 4 is arranged in the hay making machine in such a way that the open side of the generally U-shaped cross-section thereof is directed downwardly (see FIG. 3). In this embodiment, the inverted generally U-shaped cross-section has flats 7 between its substantially horizontal base and its substantially vertical limbs so as to provide additional strengthening fold lines in the sheet steel. Only near its opposite ends does the sheet metal beam 4 have a closed cross-section (see FIGS. 4 and 6 of the drawings) and in these regions cover plates 8 are secured to outwardly bent-over horizontal rims 10 of the beam by bolts 9. The opposite ends of the sheet metal beam 4 are closed by vertical head wall 11, said head walls 11 being fastened in position by welding. The beam 4 also includes sheet metal partitions 12 and 13 (preferably steel sheet) that are arranged to support bearings and shafts defining the axes of rotation of the rake heads 5 and 6. Partitions 12 and 13 that are symmetrically equivalent to those visible in FIG. 4 of the drawings are provided at the opposite ends of the sheet metal beam 4.

Each partition 13 has an angular or L-shaped cross-section the horizontal limb of which has its free edge welded to the corresponding head wall 11, said limb being formed with a circular hole through which a corresponding upright shaft 14 is entered. Each upright shafts 14 is entered through a corresponding hole in the upper surface of the beam 4 and projects a very short distance thereabove, the shafts 14 being welded to the margins of these holes and also to the margins of the holes in the horizontal limbs of the partitions 13. The substantially vertical limbs of the two partitions 13 are disposed very close to the corresponding shafts 14 and have their upper edges welded to the sheet metal beam 4. The lateral edges of the substantially vertical limbs of the partitions 13 are also welded to the sheet metal of the beam 4. The shapes of the partitions 12 can be seen best in FIGS. 3 and 6 of the drawings and those Figures show that uppermost and lateral regions of the partitions 12 are also welded to abutting surfaces of the sheet metal beam 4.

The shafts 14 project from beneath the beam 4 and each of them is surrounded, beneath the corresponding partition 13, by a corresponding spacing sleeve 15 that is rotatable about the axis of the shaft 14 concerned with the aid of an upper ball bearing 16 and a lower ball bearing 17. Each spacing sleeve 15 is coaxial with the corresponding shaft 14 and has its upper end surrounded by a bevel pinion 19 which is keyed or otherwise nonrotatably secured to it. A washer 18 surrounds each shaft 14 above the corresponding upper ball bearing 16 to space that bearing from the neighbouring partition 13. An annular plate 20 surrounds each sleeve 15 at some distance from the lowermost end thereof and has its plane in perpendicular relationship to the longitudinal axis of the sleeve.

Each partition 12 has an arched recess 21 (FIG. 3) of the inverted U-shaped configuration formed therein so as to open at the lowermost edge thereof and a driving shaft 22 passes through the recess 21. The shaft 22 is rotatably supported in a bearing 23 (FIG. 4) carried by the corresponding partition 12 but not shown in FIG. 3 of the drawings and its end, beyond the bearing 23, carries a bevel pinion 24 whose teeth are in driving mesh with those of the corresponding bevel pinion 19. It will be realised that a substantially symmetrically opposite assembly is provided at the end of the shaft 22 remote from the end thereof that is visible in FIG. 4 of the drawings. It will be noticed that the bearing 23 and pinion 24 are at one side of the partition 12 as shown in FIG. 4 of the drawings and that a further larger bevel pinion 25 is keyed to the driving shaft 22 at the opposite side of the partition 12 therefrom. In the case of the bevel pinion 25, there is no equivalent pinion near the opposite end of the shaft 22. A plate 26 that is of generally channel-shaped cross-section when viewed in a substantially horizontal direction perpendicular to the longitudinal axis of the beam 4 (FIG. 4 of the drawings) has one of its two vertical limbs secured to the partition 12 by the same bolts 27 (FIGS. 5 and 6) that are employed to fasten the bearing 23 to said partition. The substantially horizontally disposed base portion of the plate 26 is located beneath the bevel pinion 25. An oil or grease nipple 28 is mounted in an uppermost region of the sheet metal beam 4 in vertical alignment with the teeth of the bevel pinion 24 and a further similar oil or grease nipple may, if desired, be similarly mounted in vertical alignment with the teeth of the bevel pinion 25.

The two rake heads 5 and 6 are fastened to the lower end regions of the two spacing sleeves 15 and each rake head has six spokes 29. The outermost ends of the spokes 29 carry pairs of resilient tines 30. The inner ends of the spokes 29 are welded to one another in pairs and are sandwiched between a lower substantially horizontal plate 31 and an upper substantially horizontal plate 32 respectively. The lower and smaller plate 31 has six relatively inclined edges and could be considered to be of irregular hexagonal shape. The upper and larger plate 32 is of regular hexagonal shape. Each of the two plates 31 and 32 is formed with a circular hole which closely fits around the corresponding sleeve 15 for centering purposes. The upper plate 33 is formed with three holes at 120° intervals around the longitudinal axis of the corresponding shaft 14 and the corresponding annular plate 20 is formed with three screw-threaded holes arranged to register with the holes in the plate 32. Short fastening bolts 33 are entered upwardly through the holes in the plate 32 to secure the corresponding rake head 5 or 6 rigidly, but releasably, to the annular plate 20 which, in turn, is rigidly secured to one of the sleeves 15.

Each cover plate 8 has its center in substantial register with the longitudinal axis of the corresponding shaft 14 and is formed with a large central opening having an upwardly bent-over rim. The outermost edge of each cover plate 8 is bent-over downwardly to form a rim 34 whose lowermost extremity is located at a level not higher than that of the top of the corresponding upper plate 32 as considered in a direction perpendicular to the longitudinal axis of the corresponding shaft 14 (see FIG. 4 of the drawings). Each screening plate 8 has a diameter that is greater than the maximum diameter of the neighbouring upper hexagonal plate 32 (see FIGS 4 and 7) and the upper surfaces of the spokes 29 are located at a distance beneath the bottom of the sheet metal beam 4 sufficient to ensure adequate clearance during operation of the machine. It will be seen from FIG. 4 of the drawings that the clearance which has just been mentioned is approximately equal to the height of the rim 34 of each cover plate 8.

Each shaft 14 has a corresponding ground wheel 35 (FIG. 2) rotatably connected to it with the aid of a corresponding extension arm 36 that is inclined forwardly with respect to the intended direction of operation of the machine which is indicated by an arrow A in FIG. 1 of the drawings. Each extension arm 36 is provided at its uppermost end with a corresponding socket 37 into which fits the lowermost end of the co-operating shaft 14. The connections between the shafts 14 and sockets 37 are rigidly and securely maintained by two pairs of transverse pins 38 entered through the walls of the sockets and substantially diametrically through the shafts 14 themselves. The leading and lowermost ends of the extension arms 36 are bent over horizontally to form axles for the ground wheels 35 whose planes of rotation are fixed with respect to the frame portion 2 of the machine in this embodiment. The inner race of each of the two ball bearings 17 is secured against downward displacement towards the corresponding socket 37 by a washer 40 held in place by a resilient circlip 39 (FIGS. 4 and 7 of the drawings) whose inner edge fits in a groove in the material of the corresponding shaft 14.

The rake heads 5 and 6 are rotated, during the use of the machine, by rotary power applied to an input shaft 41 (FIGS. 5 and 6) of the machine with the aid of an intermediate telescopic transmission shaft, of known construction, having universal joints at its opposite ends. The shaft 41 projects inwardly through one of the walls of the sheet metal beam 4 and the internal end thereof has a bevel pinion 42 secured to it with the aid of a key. The bevel pinion 42 has its teeth in driving mesh wish those of the aforementioned bevel pinion 25. The shaft 41 is rotatably mounted in a tubular housing 45 with the aid of axially spaced apart ball bearings 43 and 44, said housing 45 having a rim or flange 46 welded to it. Four bolts 47 are entered through the rim or flange 46 to secure the housing rigidly to the substantially vertical wall of the beam 4 through which the rotary input shaft 41 is entered. The substantially coincident longitudinal axes of the housing 45 and shaft 41 extend substantially horizontally and perpendicular to the longitudinal axis of the driving shaft 22. The ball bearings 43 and 44 are prevented from becoming axially displaced by internal shoulders of the housing 45 and by a portion of the bevel pinion 42 and a circlip 48 respectively. It will be noted that small setting spaces (FIGS. 4 and 5 of the drawings) are provided along the shaft 22 between the bearing 23 and the bevel pinions 24 and 25 respectively.

Each head wall 11 projects forwardly with respect to the direction A beyond the leading wall of the sheet metal beam 4 (see FIGS. 1 and 2 of the drawings) and rod-shaped coupling elements 49 have their ends welded or otherwise rigidly secured to the forwardly projecting portions of the two head walls 11. The leading ends of the two coupling elements 49 with respect to the direction A are secured to one another at a distance forwardly from the beam 4 in the region of an upright hinge 50. In a normal operating position of the machine, the two coupling elements 49 are inclined downwardly and rearwardly with respect to the direction A from the hinge 50 (see FIG. 2 of the drawings) and, with the sheet metal beam 4, form the three sides of a triangle as seen in plan view (FIG. 1). One of the three corners of this triangle (i.e. the one that is closest to the hingge 50) is of obtuse angular formation. Each coupling element 49 has its leading end with respect to the direction A fastened to a sheet steel or other sheet metal profile 52 (FIGS. 8 and 9 of the drawings) that is shaped to embrace a substantially vertical pivot 51 of the hinge 50 at least partially. As seen in side elevation (FIGS. 2 and 8) the pivot 51 is located substantially midway between the coupling part 3 of the frame and the sheet metal beam 4. The sheet steel or other sheet metal profile 52 is bent to define three approximately right-angled corners (see FIG. 9 of the drawings) and the leading ends of the two coupling elements 49 are welded to the corresponding flat surfaces that are located at each side of the central one of said corners. The profile 52 is closed at the top by a cover 53 and at the bottom by a further cover 54, the latter forming part of a plate-shaped supporting element 55 whose general plane is perpendicular to the longitudinal axis of the pivot 51. Although, as can be seen in FIG. 9 of the drawings, the plate-shaped supporting element 55 actually has five relatively inclined edges, it can be considered as having a generally triangular shape. The pivot 51 is turnably journalled in openings in the two covers 53 and 54 and it will be seen from FIG. 8 of the drawings that, as viewed in side elevation, the pivot 51, the supporting element 55 and one of the coupling elements 49 define the three sides of a triangle.

The pivot 51 is also journalled in the limbs of a forked hinge holder 56, said hinge holder 56 being rigidly connected to the coupling part 3 of the frame by three tubular beams 59, 60 and 61. As viewed in side elevation (FIG. 8), the hinge holder 56 has an upright base, an upper short limb and a lower and relatively parallel larger limb which constitutes an extension arm 57. The hinge holder 56 is formed from sheet steel or other sheet metal and its extension arm 57 lies beneath the supporting element 55 in parallel and abutting relationship therewith. A hole is formed through the extension arm 57 towards the free end thereof and the supporting element 55 is formed with at least two similarly sized holes 58B each of which is at the same distance from the pivot 51 as the hole through the extension arm 57. A substantially vertical locking pin 58 is provided for entry through a chosen one of the two holes 58B and through the single hole in the extension arm 57 to maintain the hinge holder 56 and the parts which are secured thereto in either one of two corresponding angular settings about the axis of the pivot 51 with respect to the coupling elements 49, the profile 52 and the supporting element 55. It will be noted from FIGS. 8 and 9 of the drawings that the lower end of the locking pin 58 is provided with a transverse "safety" retaining pin 58A to ensure that the locking pin 58 shall not be accidentally displaced from its appointed position.

The three tubular beams 59, 60 and 61 are welded to the base of the hinge holder 56 and all of them extend forwardly therefrom with respect to the direction A. The leading ends of the three tubular beams which have just been mentioned are welded to the coupling part 3 of the frame (See FIGS. 1, 2 and 10 of the drawings), the beams 59 and 61 being inclined upwardly and rearwardly, with respect to the direction A, away from the coupling part 3 during the use of the machine while the beam 60 is inclined downwardly and rearwardly, with respect to the direction A, under the same circumstances. The leading end of the tubular beam 60, which is welded to the top of the coupling part 3, is provided with a coupling fork 62 adapted for connection to the upper adjustable lifting link of a three-point lifting device or hitch carried by an agricultural tractor or other operating vehicle, the lowermost ends of the inverted V-shaped coupling part 3 carrying inverted forks (FIG. 10) that are formed with vertically extending slots 63 (FIG. 2). The lower ends of the coupling part 3 of the frame may, if considered necessary, be interconnected by a transverse beam which is not shown in the drawings. As seen in side elevation (FIG. 2), the coupling part 3 of the frame forms an isosceles triangle with the tubular beams 59 and 60 and, as seen in plan view (FIG. 1), it forms a right-angled triangle with the two tubular beams 59 and 61 and also with the two tubular beams 59 and 60. This is because, as seen in plan view, the tubular beam 59 extends perpendicular to the coupling part 3 of the frame.

FIGS. 11 and 12 of the drawings illustrate an embodiment of the hay making machine in which a guide member 64 for hay or other crop displaced by the tines 30 of the two rake heads 5 and 6 is provided. The guide member 64 defines two rearwardly convergent guide surfaces 65 whose upper edges are interconnected by a guide surface 66 which is inclined downwardly and rearwardly with respect to the direction A. The guide surfaces 65 and 66 are afforded by a plurality of relatively spaced resilient rods only the leading ends of which, with respect to the direction A, are tightly clamped to a profiled tubular beam 67. As can be seen in FIG. 12 of the drawings, lower portions of the beam 67 can contact the ground surface during the operation of the hay making machine and thus protect the lower rods of the two guide surfaces 65 from such contact. It is, in fact, by no means essential that the guide surfaces 65 and 66 should be afforded by a plurality of resilient rods. The rods may satisfactorily be replaced by plates, sheets of canvas or other textile material, gauze or the like or by a combination of such parts.

Two arms 69A project upwardly and forwardly with respect to the direction A from a leading upper region of the tubular beam 67, said arms 69A being pivotally connected to vertical plates 70 by horizontally aligned pivots 69. The plates 70 are carried at the ends of corresponding arms 68 and are each formed with at least two holes 70A into chosen ones of which the tips of horizontal spring-loaded locking pins 67A carried by the arms 69A can be entered to maintain the guide member 64 in a corresponding angular setting about the axis defined by the pivots 69 relative to the arms 69 and plates 70. The arms 68 are themselves turnably connected by horizontally aligned pivots 72 to setting plates 71 each of which is formed with at least two holes 71A at equal distances from the axis defined by the pivots 72, both the axis which has just been mentioned and that defined by the pivots 69 extending parallel to the longitudinal axis of the sheet metal beam 4. The two setting plates 71 are carried at the rearmost ends, with respect to the direction A, of forwardly convergent supporting members 73, the leading ends of those members being welded or otherwise rigidly secured to one another and to the longer of the two coupling elements 49 (see FIG. 11 of the drawings). The two supporting members 73 are afforded by sheet iron or other sheet metal bars and, together with the sheet metal beam 4, define the three sides of an isosceles triangle when seen in plan view (FIG. 11). In this embodiment, the tines 30 are connected to upwardly inclined supports each of which is angularly displaceable about a corresponding axis with respect to the associated spoke 29, means being provided to retain said tine supports in chosen angular settings about the corresponding axes to alter the dispositions of the tines 30 relative to the spokes 29 with a view to attaining optimum working positions of the tines 30 for different types of ranking operations. The arrangement of the tines 30 which has just been described can be seen in outline in FIGS. 11 and 12 of the drawings and it will be noted from the former of those Figures that the maximum distance between the two guide surfaces 65 of the guide member 64 is less than the perpendicular distance between the axes of rotation of the two rake heads 5 and 6 that are defined principally by the two shafts 14.

FIG. 13 of the drawings illustrates a hay making machine which is adapted to be towed over the ground rather than to be semi-mounted upon the three-point lifting device or hitch of an agricultural tractor or other vehicle as in the cases of the foregoing embodiments. In the embodiment of FIG. 13 of the drawings, the main frame portion 1 is replaced by a draw bar 74 that is turnable relative to the hinge holder 56 about a substantially horizontal axis afforded by a pin or pins 75. An upright 76 is rigidly secured to the base portion of the hinge holder 56 and a further upright 77 is carried by the draw bar 74 at a short distance therealong from the pivot pin or pins 75. A cranked spindle 78 having a screw-threaded shank co-operates in known manner with pivotally mounted screw-threaded and plain blocks disposed at the tops of the two uprights 76 and 77 respectively so that manual rotation of the spindle 78 in one direction will cause the draw bar 74 to turn downwardly about the pivot pin or pins 75 whilst rotation thereof in the opposite direction will cause said draw bar 74 to be turned upwardly about the pivot pin or pins 75 located at the foot of the upright 76. As in the case when the main frame portion 1 is provided, the hinge holder 56 can turn about the axis defined by the pivot 51 relative to the main frame portion 2 carrying with it the draw bar 74. The draw bar 74 can thus be retained in any chosen one of at least two different angular settings about the upright axis of the pivot 51 relative to the main frame portion 2 with the aid of the locking pin 58 and the two or more holes 58B in the supporting element 55.

The hay making machine that is shown in FIG. 13 of the drawings has ground wheels 35 that are arranged in substantially the same manner as has already been described. However, as an alternative, the axles of the ground wheels 35 may be angularly displaceable about upwardly inclined axes relative to the main frame portion 2 of the machine. It is also possible to make the ground wheels 35 upwardly and downwardly displaceable relative to the main frame portion 2 and this can be done in the manner shown in FIGS. 14 and 15 of the drawings. The sockets 37 are fastened to the lowermost ends of the shafts 14 in the manner which has previously been described but the bases of said sockets 37 carry sheet steel or other sheet metal holders 79. Each ground wheel 35 is rotatably mounted on a horizontal axle formed by bending over the lower end of a generally upright leg 80. The upper end of the leg 80 is also bent over horizontally parallel to the axle of the corresponding ground wheel 35 and is entered through horizontally aligned holes in the two limbs of the corresponding holder 79, said leg 80 thus being turnable relative to the holder 79 about a substantially horizontal axis 81. An extension arm 83 is welded to the upper horizontal portion of each leg 80 and lies alongside the larger sector-shaped limb 82 of the corresponding holder 79. The end of the extension arm 83 that is remote from the leg 80 carries a horizontal locking pin 84 whose tip is urged towards the sector-shaped limb 82 by a loading spring 84A, the tip of said locking pin 84 being capable of entering any one of a number of holes 85 that are formed around the edge of the limb 82 at equal distances from the aforementioned axis 81. It will be evident from FIGS. 14 and 15 of the drawings that the particular hole 85 which is chosen for co-operation with the tip of the corresponding locking pin 84 determines the vertical level of the axle of the corresponding ground wheel 35 relative to the main frame portion 2 and thus governs the level at which said main frame portion 2 is located above the ground surface.

In the use of the first hay making machine embodiment that has been described above, the main frame portion 1 is retained in the setting indicated in full lines in FIG. 1 of the drawings relative to the main frame portion 2 by entering the locking pin 58 in the hole 58B indicated in FIGS. 1, 8 and 9. The machine is semi-mounted upon the three-point lifting device or hitch of an agricultural tractor or other vehicle by employing the coupling fork 62 and the slots 63 in a way which is known per se. The power take-off shaft of the same tractor or other operating vehicle is placed in driving connection with the rotary input shaft 41 with the aid of an intermediate telescopic transmission shaft (now shown) of known construction having universal joints at its opposite ends. Upon rotation of the power take-off shaft, the driving shaft 22 is driven by the co-operation of the pinions 42 and 25 and the driving shaft 22, in turn, rotates the two spacing sleeves 15 through the co-operation of the toothed pinions 24 and 19. The spacing sleeves 15 rotate about the two shafts 14 that are fixed to the sheet metal be am 4 and the two rake heads 5 and 6, which are respectively fastened to the two sleeves 15, rotate in opposite directions that are such that, as seen in FIG. 2 of the drawings, the rake head 5 turns in an anticlockwise direction whilst the rake head 6 turns in a clockwise direction.

When the hay making machine is to be transported from one place to another without performing any working operation, the locking pin 58 (FIGS. 8 and 9) is withdrawn upwardly and the main frame portion 2 is turned about the upright axis afforded by the pivot 51 of the hinge 50 until said locking pin 58 can be re-engaged in the hole 58B which is shown in a lower region of FIG. 9. The disposition of the main frame portion 1 relative to the main frame portion 2 will then be that indicated by broken lines in FIG. 1 of the drawings. The intended direction of non-operative transport of the machine is indicated by an arrow B in FIG. 1 of the drawings and it will be seen that the overall width of the machine in a horizontal direction perpendicular to the direction B is considerably reduced as compared with the overall width thereof in a horizontal direction perpendicular to the intended direction perpendicular to the intended direction of operative travel A. As previously mentioned, the supporting element 55 may be formed with more than two holes 58B so that intermediate relative positions of the main frame portions 1 and 2 can be adopted, for example, an intermediate position which can be employed when the machine is to displace hay or other crop in a direction that is inclined to the direction A. When additional holes 58B are provided for such purposes, it is necessary that the planes of rotation of the ground wheels 35 should be angularly adjustable about upright axes relative to the main frame portion 2 and that means should be provided for retaining the planes of rotation of the ground wheels 35 in different angular settings about such axes. It is noted that relative displacements of the frame portions 1 and 2 about the axis of the upright hinge 50 are a, most easily accomplished when the whole machine is coupled to the three-point lifting device or hitch of an agricultural tractor or other operating vehicle and is raised clear of contact with the ground by bringing said lifting device or hitch to its raised position. The machine is also transported from one place to another in the direction B in a raised position.

As seen in side elevation (FIG. 2), the upright hinge 50 is located approximately centrally between the coupling part 3 of the main frame portion 1 and the sheet metal beam 4 of the main frame portion 2. When, during the use of the machine, the ground surface causes vertical forces to act upon the rake heads 5 and 6 and the ground wheels 35 and/or when constantly varying horizontal forces are exerted upon the rake heads 5 and 6 and the ground wheels 35 and when inertia affects the lifted hay making machine, the upright hinge 50 is subject to considerably less potentially deforming forces than would be the case is said hinge 50 were to be located closer to the coupling part 3 of the main frame portion 1 that is coupled to the three-point lifting device or hitch of the operating tractor or other vehicle. The same is true of the forces exerted by the ground surface, during operation of the machine, upon the main frame portion 2 of the draw bar machine of FIG. 13 of the drawings. A satisfactorily reduced transport width of the whole machine can be obtained with the construction that has been described but, if the upright hinge 50 were to be located closer to the coupling part 3 or to the leading end of the draw bar 74, the transport width would be greater as will be evident from a study of FIG. 1 of the drawings. The particular disposition of the coupling elements 49 and the tubular beams 59 to 61 is important in this respect since it ensures that said parts do not project beyond the minimum possible transport width that is dictated by the rake heads 5 and 6 thus unnecessarily increasing that transport width. The profile 52 to which the tubular coupling elements 49 are welded provides a particularly rigid and simple way of transferring rake head, ground wheel and inertia forces to the pivot 51 in conjunction with the covers 53 and 54. The extension of the cover 54 in the form of the supporting element 55, the connection of the supporting element 55 to the coupling elements 49 and the connection of the elements 49 to the profile 52 forms a rigid triangular assembly that is capable of resisting high forces tending to deform the coupling between the main frame portion 2 and the upright hinge 50. A major component of the moment that is exerted by the main frame portion 2 upon the main frame portion 1 during transport of the machine in a raised position is exerted upon the main frame portion 1 at a location beyond the pivot 51 because the supporting element 55 bears upon the extension arm 57 thoughout a considerable surface area and since the extension arm 57 is positively connected to the supporting element 55 under these circumstances by the safety retaining pin 58A of the locking pin 58. The vertical forces under discussion are transferred directly to the main frame portion 1 through the hinge holder 56 so that shear forces acting upon the pivot 51 itself are reduced to a very low level. Further forces that are caused by the support of the main frame portion 2 from the main frame portion 1 when the machine is lifted clear of the ground for transport purposes are transferred to said main frame portion 1 by the pressure of the covers 53 and 54 upon the limbs of the hinge holder 56 in directions that extend generally axially of the pivot 51. Consequently, even with a rigid structure of the upright hinge 50, very low shear forces are exerted upon the pivot 51 so that said pivot can be supported in a relatively simple manner.

As previously mentioned, the sheet metal beam 4 to which the rake heads 5 and 6 are rotatably connected is formed from a single sheet of pressed steel or other pressed metal and is of inverted substantially U-shaped or channel-shaped cross-section. The open side of this cross-section is located at the bottom of the beam and extends lengthwise thereof. The partitions 12 and 13 are, preferably, also formed from sheet steel and can be mounted inside the beam 4, during its manufacture, in a simple manner by, for example, spot welding. The use of cast iron frame portions is avoided in the construction of the beam 4 and this results in a considerable reduction in costs since the beams 4 can be produced as a continual process rather than in batches because only sheet steel or other sheet metal is employed. As previously mentioned, the bends interconnecting the inclined flats 7 and the horizontal rims 10 appreciably increase the resistance to deformation of the beam 4. The importance of the open lower surface of the beam 4 is apparent in the manufacture of the machine. The partitions 12 and 13 are placed in positions and are fastened to the beam 4 itself with the aid of a jig. The bearings 23 and the pinions 24 and 25 are mounted on the driving shaft 22 prior to the installation of that shaft in the beam 4 and it will be realised that said shaft and pinions can readily be entered into the interior of the beam 4 through the open bottom thereof in a direction perpendicular to the longitudinal axis of the beam. The shaft 2 is entered in the recess 21 (FIGS. 3 and 6) from the lower edges of the partitions 12 which edges face the open bottom of the beam 4. The bearings 23 that are already carried by the shaft 22 are then secured to the partitions 12 by the bolts 27.

Due to the fact that the open bottom of the sheet metal beam 4 extends lengthwise of that beam, the installation of the driving shaft 22 and other associated parts can be accomplished without difficulty and the whole operation is readily visible, the mounting points of the bearings 23 being directly accessible from the bottom of the beam. The small setting spaces that are left between the pinions 24 and 25 and the bearings 23 enable said bearings to be displaceable short distances along the driving shaft 22 so that slight variations in the shapes and positions of the partitions 12 can be compensated for without difficulty. The open bottom of each beam 4 facilitates quick and simple assembly particularly because the driving shaft 22 and its bearings and pinions can be dealt with using jigs and convential installation techniques. The speed of assembly is considerably greater than would be possible if the shaft 22 and its associated pinions and bearings had to be inserted substantially axially through an opening at one end of the beam. The described method of construction and assembly of the beam 4 and its associated parts can, of course, equally well be employed in the making of agricultural implements other than hay making machines.

Each of the two rake heads 5 and 6 is connected to the corresponding pinion 19 in a simple manner by the employment of the three bolts 33 (FIGS. 4 and 7 of the drawings). This simple form of mounting makes it possible to exchange the rake heads in a very short space of time and the accuracy of the circular openings in the plates 31 and 32 with respect to the external surface of the spacing sleeve 15 ensures automatic and correct centring of the rake heads. The sheet steel or other sheet metal cover plates 8 are strengthened by their rims 34 and shield the pinions 19 and 24 from displaced crop by effectively closing off the bottom of the beam 4 at its end to dispose the pinions 19 and 24 in a box. This closed box-like construction is effective in transferring forces that are exerted on the beam 4 during the use of the machine to the head walls 11 at the ends of the beam and thence to the tubular coupling elements 49. The plate 26 shields the pinions 25 and 42 from displaced crop and also acts to collect the oil or grease that is employed in the lubrication of said pinions. The central region of the beam 4 that is completely open at the bottom is only lightly loaded during operation of the machine by bending and torsional forces because the forces that act upon the rake heads and ground wheels are transferred to the coupling elements 49 substantially directly by way of the head walls 11. When the crop guide member 64 is provided, its guide surfaces 65 and 66 co-operate to form a swath basket that is adapted to form the hay or other crop that is displaced centrally between the two rake heads 5 and 6 into a single swath or windrow of neat and compact cross-section. As previously mentioned, the guide surfaces 65 and 66 may be formed in other ways from the one that has been described and it is, in fact, possible to have two separate guide surfaces 65 and to omit the upper guide surfaces 66. During the formation of a swath or windrow of hay or other crop, lower portions of the tubular beam 67 slide over the ground surface in the manner which will be evident from FIG. 12 of the drawings but the whole guide member 64 can turn upwardly and downwardly about the horizontal pivot 69 since the two locking pins 67A are retained in inoperative withdrawn position at such times. The guide member 64 may be placed in the inoperative position shown in broken lines in FIG. 12 of the drawings and be retained in that position by withdrawing the locking pins 67A and the locking pins that are carried by the arms 68, subsequently turning the arms 68 upwardly about the pivots 72 and the arms 69A downwardly about the pivots 69 until the broken line position of FIG. 12 is reached. The withdrawn locking pins will then co-operate with the alternative holes 70A and 71A respectively to retain the crop guide member 64 in its elevated inoperative position which position is, of course, also desirably employed during inoperative transport of the machine. It is sometimes desirable that the crop guide member 64 should not be upwardly and downwardly displaceable about the pivots 69 during operation of the machine and, under these circumstances, the locking pins 67A can be operatively engaged with the appropriate holes 70A in the plates 70 as shown in FIG. 12 of the drawings. In order not to exert upon a central region of the sheet metal beam 4 all of the forces that act upon the guide member 64 during the use of the machine (such as ground resistance, crop resistance and the like), and also the weight of the guide member 64 itself, the pivots 72 are supported in their appointed positions principally by the bar- or strip-like members 73 which are rigidly secured to one of the coupling elements 49 at their leading ends. The forces which bear upon the crop guide member 64 are thus transferred directly to the main frame portion 2 and this is, of course, also true of the weight of the guide member 64 when it occupies the upwardly withdrawn inoperative position thereof that is shown in FIG. 12 of the drawings. The previously mentioned triangular disposition of the two supporting members 73 and the central region of the sheet metal beam 4 (see FIG. 11 of the drawings) is of significance in transferring these forces effectively to the main frame portion 2.

The hay making machine of FIG. 13 of the drawings, which is provided with a draw bar 74 in place of the frame portion 1, has the same advantages as have been described for the machines of FIGS. 1 to 12 that are intended for semi-mounting upon the lifting devices or hitches of agricultural tractors or other operating vehicles. As can be seen in FIG. 13 of the drawings, the heights of the tines 30 relative to the ground surface in the lowermost leading positions thereof with respect to the direction A are determined principally, but not exclusively, by the angular setting of the draw bar 74 about the pin or pins 75 with respect to the remainder of the machine. The angular disposition which has just been mentioned is, of course, governed by appropriate manual adjustment of the cranked spindle 78. The holder 79 which is shown in FIGS. 14 and 15 of the drawings ensures a stable connection of the profiled leg 80 to the corresponding shaft 14 whilst permitting the axis of rotation of the ground wheel 35 concerned to be raised or lowered with respect to the frame of the machine. The construction of the holder 79 from a single profiled steel or other metallic sheet is most advantageous in this connection. The coupling of the sockets 37 to the lower ends of the shafts 14 by the pairs of transverse pins 38 can be carried out quickly and easily but provides strong and reliable joints. The various constructions and arrangements which have been described could, of course, equally well be applied to a hay making machine having only a single rake head or other rake member or to a hay making machine having three or more rake heads or other rake members.

Although various features of the hay making machines that have been described and/or illustrated in the accompanying drawings will be set forth in the following claims as inventive features, it is emphasised that the invention is not necessarily limited to those features and that it encompasses within its scope all of the parts of each hay making machine that has been described and/or illustrated in the accompanying drawings both individually and in various combinations.

Having thus described my invention, what I claim as new and desire by Letters Patent of the United States is:

1. A method of operatively connecting rotary rake members on agricultural implement in driving engagement with the power take off of a prime mover, comprising passing the shaft of an input pinioned shaft through an opening in the front wall of an elongated hollow frame beam having an open bottom, entering a drive shaft having pinion gears mounted at each end thereof each with bearings together with an intermediate pinion gear, all assembled as a unit, through the open bottom of said frame beam, retaining the further pinion gear in driving engagement with the input shaft and securing the bearings within recesses of partitions that are spaced apart within said frame beam, and fastened to same adjacent each end thereof, positioning the drive shaft parallel to the longitudinal axis of the beam, then connecting the end pinion gears of said drive shaft to the driving gears of each of the rotary members.

2. A method as claimed in claim 1, wherein the input shaft is entered into the interior of the frame beam in a direction substantially perpendicular to the longitudinal axis of the beam and the drive shaft.

3. A method as claimed in claim 1, wherein at least one of the bearings on the driving shaft is bolted to an intermediate partition in the interior of the beam that extends substantially perpendicularly transverse to the longitudinal axis of the beam.

4. A method as claimed in claim 3, wherein the drive shaft is fitted and then bolted within U-shaped recesses of the partitions adjacent each end of said frame beam.

5. A method of connecting spaced apart rotary members of an agricultural implement frame with driving means, said rotary members having corresponding upwardly extending shafts supported on said frame, comprising, securing spaced apart recessed partitions within a profiled hollow beam of inverted U-shaped configuration and facing the recesses towards the open bottom of the beam, assembling an elongated drive shaft with bearings and driven pinion gears at each end thereof, entering the assembled drive shaft through the open bottom side and within the recesses of the partitions, securing said bearings to the partitions and placing the driven pinion gears in driving engagement with the rotary members.

6. The method of claim 5 wherein said partitions are of inverted substantially U-shaped cross section and the opposite open ends of said beam are first closed by head walls secured to the beam ends and L-shaped partitions are attached to bridge the upper surface of the beam with each head wall.

7. The method of claim 5, wherein the corresponding upwardly extending shafts are each entered through aligned holes provided in the L-shaped partitions and the upper surface of the beam.

8. The method of claim 7, wherein the rotary members are each connected to a sleeved pinion gear by bolts and the sleeved pinion gears are meshed with the driven pinion gears when the drive shaft is fitted within the beam.

9. The method of claim 5, wherein a bevel pinion is secured to the drive shaft between the driven pinion gears before the shaft is entered through the open side of the beam and the bevel pinion is meshed with an input pinioned shaft that is first passed through the front of the beam.

10. The method of claim 5, wherein the bearings are bolted to the partitions and the input pinioned shaft is mounted on a bearing that is bolted to the front of said beam when the pinion of the input shaft is placed in mesh with the bevel pinion.

* * * * *